United States Patent
Kimura et al.

[11] Patent Number: 5,979,020
[45] Date of Patent: Nov. 9, 1999

[54] HOSE CLIP AND RELEASING BAR TOOL THEREFOR

[75] Inventors: Akira Kimura; Isao Kato; Masahide Sato; Yuji Nakamura; Kazuyoshi Murase, all of Aichi, Japan

[73] Assignee: Togo Seisakusyo Corporation, Aichi-ken, Japan

[21] Appl. No.: 09/076,719

[22] Filed: May 13, 1998

[30] Foreign Application Priority Data

May 16, 1997 [JP] Japan ..................................... 9-126570
Jan. 16, 1998 [JP] Japan ..................................... 10-007074

[51] Int. Cl.⁶ ............................. B65D 63/10; F16L 33/02
[52] U.S. Cl. ...................... 24/20 R; 24/20 CW; 24/205; 24/20 EE
[58] Field of Search ................................ 24/20 R, 20 EE, 24/20 CW, 23 EE, 23 R; 285/367, 406

[56] References Cited

U.S. PATENT DOCUMENTS

| | | | |
|---|---|---|---|
| 4,713,863 | 12/1987 | Jennings | 24/20 R |
| 4,930,192 | 6/1990 | Muhr | 24/20 R |
| 4,996,749 | 3/1991 | Takahashi | 24/20 R |
| 5,185,907 | 2/1993 | Kawashima et al. | 24/20 R |
| 5,414,905 | 5/1995 | Kimura et al. | 24/20 R |
| 5,596,790 | 1/1997 | Möller | 24/20 S X |
| 5,620,209 | 4/1997 | Sauer | 24/20 R X |
| 5,644,819 | 7/1997 | Lyons | 24/20 R |
| 5,664,295 | 9/1997 | Kume et al. | 24/20 R |

*Primary Examiner*—James R. Brittain
*Assistant Examiner*—Robert J. Sandy
*Attorney, Agent, or Firm*—Wenderoth, Lind & Ponack, L.L.P.

[57] ABSTRACT

A hose clip for clamping a hose includes a clamping ring formed by annularly bending a strip of spring plate and deformed between a reduced-diameter state and a spread-diameter state. An arcuate portion is formed in either one of the ends of the clamping ring. A first knob is formed by bending the arcuate portion radially outward with respect to the clamping ring. A second knob is formed by bending the other free end of the clamping ring radially outward with respect to the clamping ring as so to pass through the arcuate portion. An engaged piece is formed on the one end of the clamping ring so as to project axially with respect to the clamping ring within a width of the spring plate. An engaging edge is formed on the other end of the clamping ring so as to move over the engaged piece and engage it when the first and second knobs are slid to come close to each other, thereby holding the clamping ring in the spread-diameter state with the knobs being substantially superposed. Also, a guide face is formed on a portion of the engaged piece with which the engaging edge engages. The guide face axially displaces the engaged piece and the engaging edge when the knobs come close to each other so that the engaged piece abuts the engaging edge.

9 Claims, 13 Drawing Sheets

HOSE CLIP AND RELEASING BAR TOOL THEREFOR

BACKGROUND OF THE INVENTION

1. Field of the Invention

This invention relates to a hose clip for clamping a hose and a releasing bar tool used for releasing the hose clip from a spread-diameter state to a reduced-diameter state in which the hose clip clamps the hose.

2. Description of the Prior Art

The prior art has provided hose clips clamping for a hose by using a spring force which is inherent therein. The hose clips are used in an engine room of an automobile, for example. It is desirable that the hose clip should be conveyed or carried in a spread-diameter state in consideration of works at a job site. For this purpose, the prior art has provided a hose clip of the type in which knobs provided at both ends thereof are held by a holder so that the hose clip is held in the spread-diameter state. In this construction, however, the spring force of the holder springs out the holder to thereby scatter it in the job site when the holder is pulled out so that the hose clip is released into the spread-diameter state. To overcome this problem, the prior art has proposed a hose clip provided with a function of holding itself in the spread-diameter state without use of the holder. This hose clip is referred to as "self-holding type hose clip."

The assignee of the present invention has proposed such a self-holding type hose clip in a Japanese utility model application which was laid open under the Japanese laid-open utility model publication No. 6-69581. FIG. 17 illustrates the proposed hose clip. The hose clip comprises a clamping ring 30 formed by circularly bending a strip of spring plate. An arcuate first knob 31 is formed at the side of one of two free ends of the clamping ring 30. A second knob 32 is formed at the other free end side of the clamping ring 30. The second knob 32 is caused to pass through the first knob 31 and then to rise to thereby be opposed to the first knob 31. A hose H can be clamped by the hose clip when the diameter of the clamping ring 30 is reduced into a free state. On the other hand, when both knobs 31 and 32 are caused to come close to each other, the clamping ring 30 is deformed so that the hose clip can be attached to and detached from a hose H.

In order that the clamping ring 30 may be held in the spread-diameter state, the first knob 31 is formed with an engagement strip 33 extending from an inner side edge of a right-hand leg thereof and having a distal end curved frontward. The second knob 32 has an arm 34 protruding from a right-hand edge of the right-hand side edge thereof toward the first knob 31. The arm 34 includes a temporary holding claw 35 having an arcuate guide face 36 engaged with and disengaged from the engagement strip 33.

In order that the clamping ring 30 may be held in the spread-diameter state, both knobs 31 and 32 are held by a pair of pliers P as shown in FIG. 18A. Then, the temporary holding claw 35 rides via the guide face 36 onto the engagement strip 33. The knobs 31 and 32 come close to each other with the second knob 32 being displaced in the direction of the arrow or axially with respect to the clamping ring 30. Upon riding over the distal end of the engagement strip 33, the temporary holding claw 35 is engaged at the backside of the engagement strip 33 with the second knob 32 being returned by a restoring spring force, so that the clamping ring 30 is held in the spread-diameter state. On the other hand, when the hose clip is released from the spread-diameter state, the knobs 31 and 32 are held by the pliers P widthwise as shown in FIG. 18B. The knobs 31 are then forced to move axially with respect to the clamping ring 30, so that the temporary holding claw 35 is disengaged from the engagement strip 33. Consequently, the clamping ring 30 is deformed by the restoring spring force into the reduced diameter state. In the above-described hose clip, the clamping ring 30 is deformed axially but not radially when held in and released from the spread-diameter state. Consequently, the clamping ring 30 can be prevented from being deformed to such a degree that the circularity thereof is lost.

The above-described hose clip, however, presents the following problems. First, as shown in FIG. 18B, a gap or space S is defined between the knobs 31 and 32 when the clamping ring 30 has been held in the spread-diameter state. A maximum radius of the clamping ring 30 in the spread-diameter state can be obtained when both knobs 31 and 32 come close to each other until they are superposed. In the case of the above-described hose clip, however, the clamping ring 30 is held when it is reduced from the maximum radius by a predetermined amount. Thus, the hose clip is attached to and detached from the hose H in the reduced state from the maximum radius. This results in difficulty in the attaching and detaching works.

Furthermore, portions of the respective knobs 31 and 32 held by the pliers P are shifted from each other with the space S defined therebetween when the clamping ring 30 is released from the spread-diameter state, as shown in FIG. 18B. In this case, since the knobs 31 and 32 are twisted, the pliers P tend to be disengaged from the hose clip. This results in difficulty in the releasing work. Moreover, the hose clip is sometimes attached to the hose H obliquely when the knobs 31 and 32 have been twisted. In this case, since the hose clip is to be completely fitted over the entire circumference of the hose H, the sealing performance of the hose clip is reduced.

Furthermore, the temporary holding claw 35 is provided at the distal end of the arm 34. In forming the arm 34, the spring plate strip is stamped out of the material in a developed form, and the arm 34 projects from the base of the knob 32 on the same plane. Thereafter, the arm 34 needs to be bent. Thus, the projecting arm 34 increases an area of the strip in the developed form, resulting in reduction in the yield of the material and accordingly an increase in the manufacturing cost.

Additionally, the pliers must be used to release the hose clip from the spread-diameter state. The use of the pliers requires a working space to accommodate an open state of the pliers around the hose clip. However, it is sometimes difficult to secure sufficient working space in an engine room of an automobile which is closely packed with a large number of parts. Moreover, the pliers are applied to the hose clip only from above the same. This reduces a degree of freedom in selecting places where the hose clip can be installed.

SUMMARY OF THE INVENTION

Therefore, an object of the present invention is to provide a hose clip which can efficiently be released from the spread-diameter state and a releasing bar tool for the hose clip.

The present invention provides a hose clip including a clamping ring formed by annularly bending a strip of spring plate having two free ends. The clamping ring is deformed between a reduced-diameter state in which a diameter thereof is reduced with each free end thereof being maintained in a natural state and a spread-diameter state in which the free ends thereof are caused to come close to each other so that the diameter thereof is increased. The hose clip holds a hose inside the clamping ring when the clamping ring is in the reduced-diameter state. The hose clip comprises an arcuate portion formed in either one of the free ends of the clamping ring by removing a central portion of the spring plate with an edge portion being left, a first knob formed by bending the arcuate portion radially outward with respect to the clamping ring, and a second knob formed by bending the other free end of the clamping ring radially outward with respect to the clamping ring. The second knob is slidable so as to come close to and depart away from the first knob. An engaged piece is formed on the one free end of the clamping ring so as to project axially with respect to the clamping ring within a width of the spring plate. An engaging edge is formed on the other free end of the clamping ring so as to get over the engaged piece so as to be engaged therewith when the first and second knobs are slid towards each other. Thus, the clamping ring is held in the spread-diameter state with the knobs being substantially superposed, and a guide face is provided on a portion of the engaged piece with which the engaging edge is engaged. The guide face displaces the engaged piece and the engaging edge axially with respect to the clamping ring relative to the clamping ring when the knobs come close to each other so that the engaged piece abuts the engaging edge.

According to the above-described construction, the other knob is axially displaced along the guide face when both knobs are caused to come close to each other. When getting over the extended end of the engaged piece, the other knob is returned by a restoring spring force to thereby be displaced to the backside of the engaged piece, so that the other knob is engaged with the engaged piece. As a result, the clamping ring is held in the spread-diameter state with both knobs being substantially superposed. On the other hand, when the other knob is forced to axially move to thereby be disengaged from the engaged piece, the clamping ring is deformed into the reduced-diameter state by the restoring spring force. Thus, the clamping ring is held in the spread-diameter state with both knobs being substantially superposed, that is, the clamping ring is held approximately in its maximum diameter. Consequently, the hose clip can easily be attached to and detached from the hose. Furthermore, the knobs are substantially aligned when being held by a tool such as the pliers so that the clamping ring is released from the spread-diameter state. Consequently, since a holding force exerted by the tool smoothly and effectively displaces both knobs axially, the releasing work can readily be performed. Additionally, since the engaged piece is within the width of the knob, the clamping ring has no outwardly projecting portions in the developed form. Consequently, the yield of the material can be improved.

In a first preferred form, two guide faces are formed on an extended end of the engaged piece and a side edge of the other knob, respectively. The guide faces have the same inclination, and the guide faces slide when the knobs come close to each other, thereby guiding the other knob so that the other knob is displaced axially with respect to the clamping ring relative to the clamping ring. In this construction, when both knobs are caused to come close to each other, the other knob is axially displaced with the guide faces are slid on each other. When the guide face of the other knob gets over the distal end of the guide face at the engaged piece side, the other knob is returned by a restoring spring force to thereby be displaced to the backside of the guide face at the engaged piece side, so that the guide face of the other knob is engaged with the guide face at the engaged piece side. Thus, the clamping ring is held in the spread-diameter state with both knobs being substantially superposed. Since the guide faces are formed on the extended end of the engaged piece and the side edge of the other knob respectively, the knobs are smoothly guided in a direction to be displaced. Furthermore, both guide faces have the same inclination, and the guide face at the engaged piece side serves to prevent fall-off of the knob when displaced to the backside of the guide face at the other knob side. Thus, the clamping ring can reliably be held in the spread-diameter state. Additionally, the yield of the material can also be improved since the guide face is within the width of the knob.

In another preferred form, at least either one of the knobs has a releasing operation portion formed toward the other knob. According to this construction, when the hose clip is released from the spread-diameter state with both knobs being engaged with each other, the releasing operation portion is held by the tool so that both knobs are axially displaced. The operation portion is formed so as to face the counterpart or more specifically, the distance between the operation portion and the counterpart is reduced. Accordingly, portions held by the tool are substantially aligned. Thus, since the operating force acts on the same plane, the knobs are disengaged from each other without twisting of the hose clip. Consequently, the hose clip returns to the reduced-diameter state, while retaining its circularity, by the spring force, thereof, and thereby clamping the hose in its normal state. As the result of this construction, the hose clip can be prevented from being obliquely fitted with the hose as in the prior art, and the normal disposition of the hose clip and sufficient sealing performance thereof can be ensured.

The invention also provides a hose clip including a clamping ring formed by annularly bending a strip of spring plate having two free ends. The clamping ring is deformed between a reduced-diameter state in which a diameter thereof is reduced with each free end thereof being maintained in a natural state and a spread-diameter state in which the free ends thereof are caused to come close to each other so that the diameter thereof is increased. The hose clip holds a hose inside the clamping ring when the clamping ring is in the reduced-diameter state. The hose clip comprises an arcuate portion formed in either one of the free ends of the clamping ring by removing a central portion of the spring plate with an edge portion being left. A first knob is formed by bending the arcuate portion radially outward with respect to the clamping ring, and a second knob is formed by bending the other free end of the clamping ring radially outward with respect to the clamping ring. The second knob is slidable so as to come close to and depart away from the first knob, and an engaged piece is formed on the one free end of the clamping ring so as to project axially with respect to the clamping ring within a width of the spring plate. An engaging edge is formed on the other free end of the clamping ring so as to get over the engaged piece to be engaged therewith when the first and second knobs are slid in a direction towards each other, thereby holding the clamping ring in the spread-diameter state with the knobs being substantially superposed. Also, an insert space is defined between side edges of the respective knobs. In the hose clip, a bar tool is inserted into the insert space so that the knobs are moved axially with respect to the clamping ring relative to the clamping ring upon prying with the bar tool to release the engaged piece and the engaging edge from engagement.

According to the above-described hose clip, the first and second knobs are caused to come close to each other so that the engaged piece is engaged with the other knob. Thus, the hose clip is held in the spread-diameter state. In this state, the hose clip is fitted with the hose. When the hose clip is released from the spread-diameter state, the distal end of the bar tool is inserted into the insert space defined between the knobs. Upon prying with the bar tool, the other knob is displaced in such a direction that the gap between the knobs is increased or axially with respect to the clamping ring, so that the engaged piece is disengaged from the other knob. The clamping ring is then deformed into the reduced-diameter state by its spring force, thereby clamping the hose. Thus, the clamping ring can be released from the spread-diameter state by the bar tool. The bar tool requires a smaller working space as compared with a tool such as the pliers which necessitates the opening A space is preferably defined between the knobs when the clamping ring is in the spread-diameter state, and the space is preferably set to be smaller than an outer diameter of a distal end of the bar tool. Since the hose clip is provided with no space other than the insert space, the releasing work can smoothly be carried out.

The insert space is preferably formed to be nearer to the clamping ring than to the engaged piece. Consequently, an amount of operation of the bar tool can be rendered smaller as compared with the case where the insert space is formed so as to be farther away from the clamping ring than the engaged piece.

Either one of the side edges of the respective knobs, defining the insert space, preferably has a stopper protrusion located near the clamping ring. The stopper protrusion renders the space between the knobs smaller than the outer diameter of the distal end of the bar tool from the side of either knob. The tool is caught by the stopper protrusion even when the tool is inadvertently detached from the insert space during the releasing operation, for example. Consequently, the hose can be prevented from being damaged by the tool.

The bar tool is preferably provided for releasing the knobs from engagement with each other when the clamping ring is in the spread-diameter state, and the bar tool preferably comprises a grip portion, a master releasing portion extending axially with respect to the grip portion in the form of a bar, and a branched releasing portion branched from the master releasing portion and extending in the form of a bar. The hose clip can be released from the spread-diameter state from various directions by a single tool.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
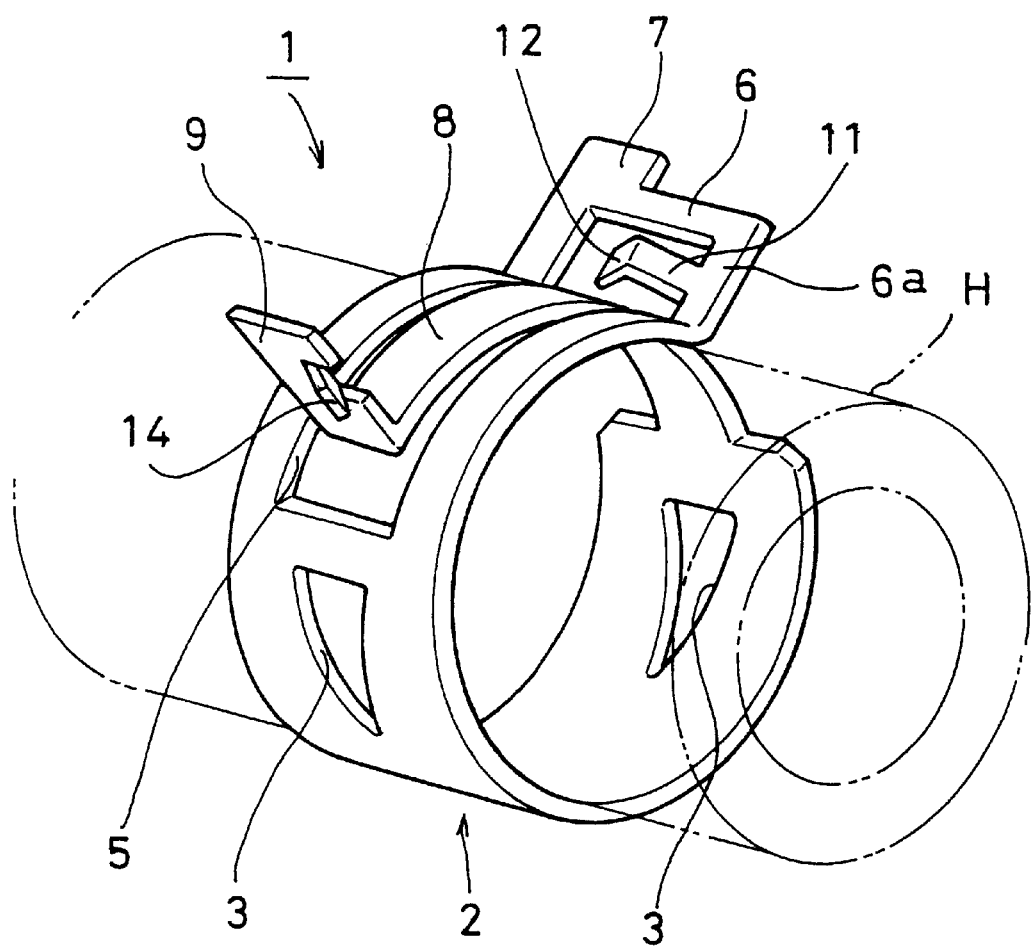
FIG. 1 is a perspective view of the hose clip of a first embodiment in accordance with the present invention, showing the hose clip clamping the hose.

A first embodiment of the present invention will be described with reference to FIGS. 1 to 4. Referring to FIG. 1, a hose clip 1 in accordance with the present invention is shown clamping a hose H. The hose clip 1 comprises a clamping ring 2 formed by circularly bending a strip of spring plate. The clamping ring 2 has two openings or triangular windows 3 in a circumferential face thereof so that a generally uniform clamping force is applied to an entire circumference of the hose H. The clamping ring 2 further has a groove 5 formed in a side of one of two ends thereof and having a predetermined length. The end including a part of the groove 5 is bent to rise radially with respect to the clamping ring 2, thereby serving as an arcuate first knob 6. The first knob 6 includes an operation portion 7 projecting from one side (left-hand side as viewed in FIG. 1) of the upper edge thereof. The operation portion 7 is utilized when the clamping ring 2 is released from a spread-diameter state as will be described later.

The clamping ring 2 has a tapered narrow portion 8 at the other end side thereof. The narrow portion 8 has approximately the same length as the groove 5. The other end of the clamping ring 2 is bent, passing through the first knob 6, so that the other end is spaced from both side edges of the groove 5 and has approximately the same curvature as the groove 5 portion of the clamping ring 2. The other end of the clamping ring 2 is bent to rise radially with respect to the clamping ring, thereby serving as a second knob 9. The second knob 9 is opposed to the first knob 6 and has approximately the same height as the first knob 6. More specifically, the hose clip 1 clamps the hose H when the diameter of the clamping ring 2 is reduced into a free state of the clamping ring. Both knobs 6 and 9 are caused to come close to each other so that the clamping ring 2 is deformed to spread the diameter thereof. A maximum radius of the clamping ring 2 is obtained when the knobs 6 and 9 are superposed.

A structure for holding the clamping ring 2 in a spread-diameter state will now be described. The first knob 6 has an engaged piece 11 formed on an inside edge of a right-hand leg 6a thereof as viewed in FIG. 1. The engaged piece 11 extends from a central portion of the inside edge of the leg 6a sidewise, protruding slightly obliquely toward the second knob 9 side. The engaged piece 11 has a distal end which is bent conically to thereby serve as an inclined guide face 12.

The second knob 9 has an engaged piece 14 formed on a right-hand side edge thereof as viewed in FIG. 1. The engaged piece 14 corresponds to the engaged piece 11 in a height thereof. The engaged piece 14 is formed by cutting and raising the right-hand side edge of the second knob 9. The engaged piece 14 is inclined approximately at the same inclination as the guide face 12 of the engaged piece 11 in the direction opposite to a direction in which the first knob 6 is inclined. When both knobs 6 and 9 are caused to come close to each other, the engaged piece 14 abuts the surface of the guide face 12 of the engaged piece 11 and moves to the back of the guide face.

Figure 2A:
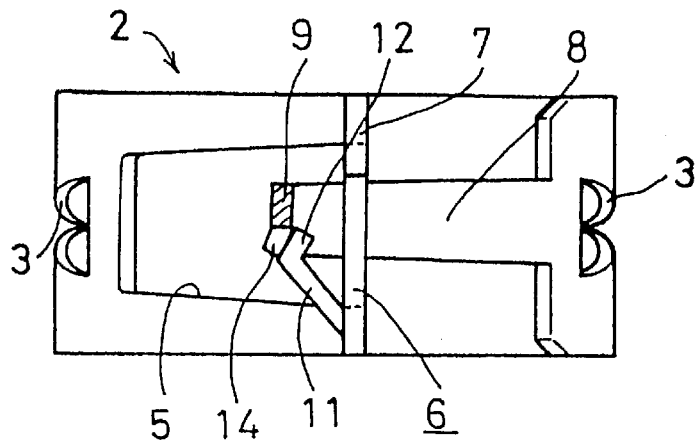
FIGS. 2A, 2B and 2C are views showing the manner of holding the clamping ring in the spread-diameter state.
Figure 2B:
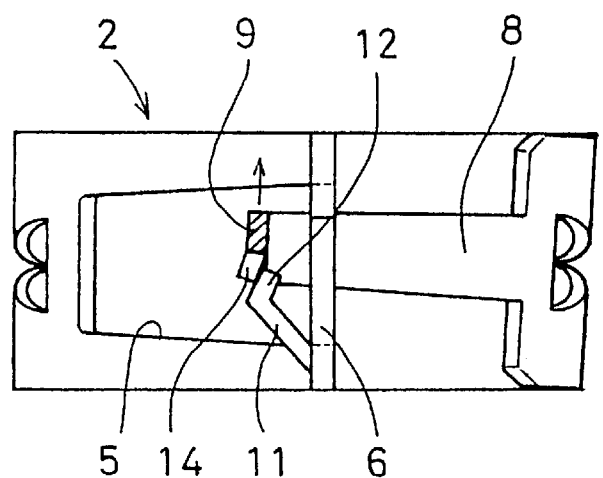
Figure 2C:
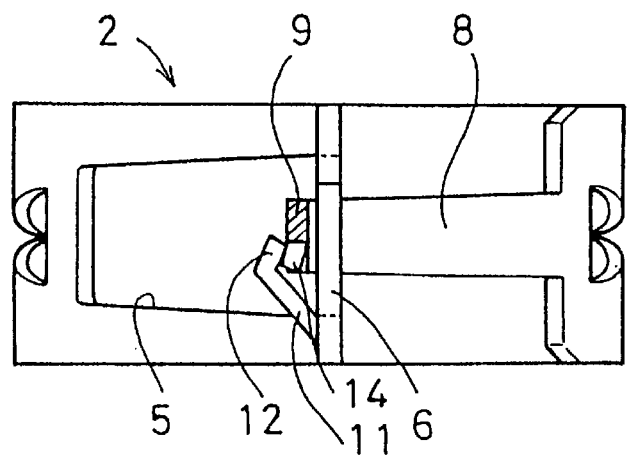
Figure 3:
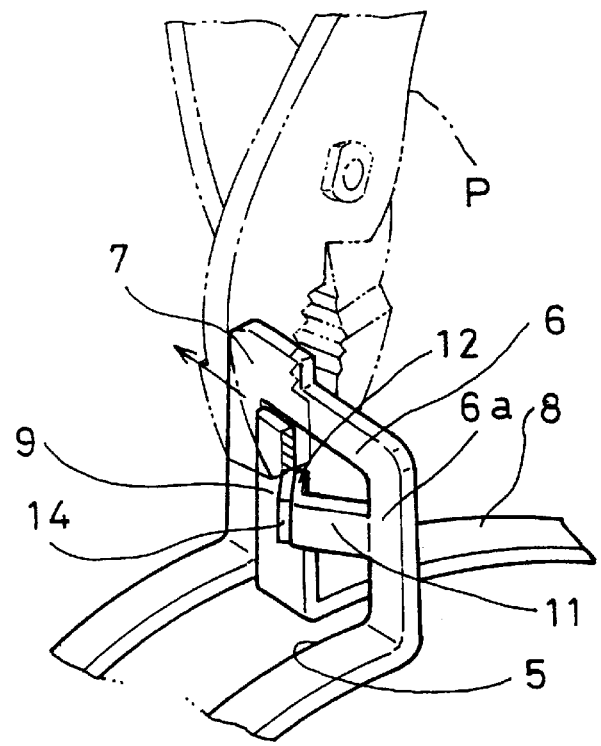
FIG. 3 is a partial perspective view of the hose clip, showing the diameter spreading operation.
Figure 4:
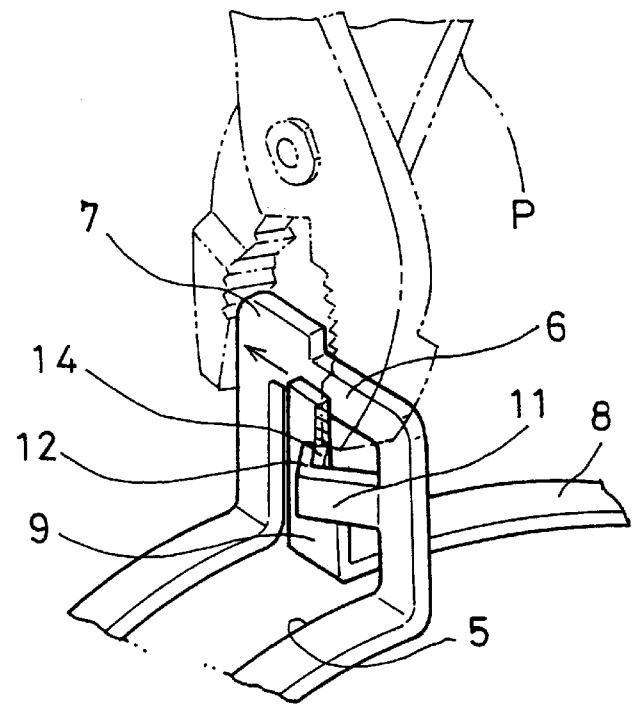
FIG. 4 is a partial perspective view of the hose clip, showing the releasing operation.

The operation of the hose clip 1 will now be described. The clamping ring 2 is first held in the spread-diameter state before the hose clip 1 is attached to the hose H. In this case, straight jaws of pliers P are applied to the upper ends of the knobs 6 and 9 of the hose clip 1 in the free state, respectively, as shown in FIG. 3. When handles of the pliers H are gripped, the knobs 6 and 9 come close to each other such that the engaged piece 14 of the second knob 6 abuts the surface of the guide face 12 of the engaged piece 11, as shown in FIG. 2A. When the pliers H are further gripped, external forces subjected to the engaged piece 14 and the guide face 12 respectively cause the engaged piece 14 to slide on the surface of the guide face 12 as shown in FIG. 2B, so that the engaged piece 14 is displaced in the direction of arrows in FIGS. 2B and 3 or axially with respect to the clamping ring 2. When the engaged piece 14 goes over the distal end of the guide face 12, the second knob 9 returns to its former position and the engaged piece 14 moves to the back side of the guide face 12 to thereby engage the engaged piece 11, as shown in FIG. 2C. As a result, the clamping ring 2 is held in the spread-diameter state with the knobs 6 and 9 being substantially superposed.

The hose clip 1 is carried to a work site for connection of the hose H with the clamping ring 2 thereof being held in the spread-diameter state. At the work site, the clamping ring 2 in the spread-diameter state is fitted on a nozzle of the hose H, and then, the hose H is fitted on a pipe (not shown). Then, the straight jaws of the pliers P are applied to an outer face of the operation portion 7 of the first knob 6 and the upper end of the second knob 9 respectively. When the pliers P are gripped hard, both knobs 6 and 9 are displaced against the spring force axially with respect to the clamping ring 2, so that the engaged piece 14 is released from the engagement with the engaged piece 11. Consequently, the clamping ring 2 is deformed into the reduced-diameter state by its own restoring spring force as shown in FIG. 1, and the hose H is clamped to the pipe so as to be connected thereto.

When the hose H is replaced with a new one, the clamping ring 2 is deformed into the spread-diameter state in the manner as described above, and the hose clip 1 is moved to the pipe side. The hose clip 1 is returned to the nozzle of the hose H after a new hose H has been fitted on the pipe. The clamping ring 2 is then released from the spread-diameter state in the same manner as described above. As a result, the hose H is readily clamped by the clamping ring 2.

According to the above-described embodiment, the clamping ring 2 of the hose clip 1 is deformed axially but not radially when held in and released from the spread-diameter state. Consequently, there is less possibility that the clamping ring 2 is deformed so as to thereby loose its circularity.

The clamping ring 2 can be held in the spread-diameter state with both knobs 6 and 9 being substantially superposed, that is, the clamping ring 2 can be held approximately in its maximum diameter. Consequently, the hose clip 1 can easily be attached to and detached from the hose H. Furthermore, the knobs are substantially aligned when being held by the pliers P so that the clamping ring 2 is released from the spread-diameter state. Consequently, since a holding force exerted by the pliers P smoothly and effectively displaces both knobs axially, the releasing work can readily be performed.

The engaged piece 14 is provided on the side edge of the second knob 9 and has approximately the same inclination as the guide face 12 of the distal end of the engaged piece 11 provided on the first knob 6. With the engaged piece 14 being slid on the surface of the guide face 12, the relative displacement of the second knob 9 is guided. Thus, the relative displacement of the second knob 9 can smoothly be carried out. Furthermore, when the engaged piece 14 moves to the back side of the guide face 12, the inclined portion thereof prevents the knob from falling off. Consequently, the clamping ring 2 can reliably be held in the spread-diameter state. Additionally, the engaged piece 11 and the engaged piece 14 are formed within the widths of the first and second knobs 6 and 9 respectively. Thus, the clamping ring 2 has no outwardly projecting portions. Consequently, the yield of the material can be improved.

Figure 5:
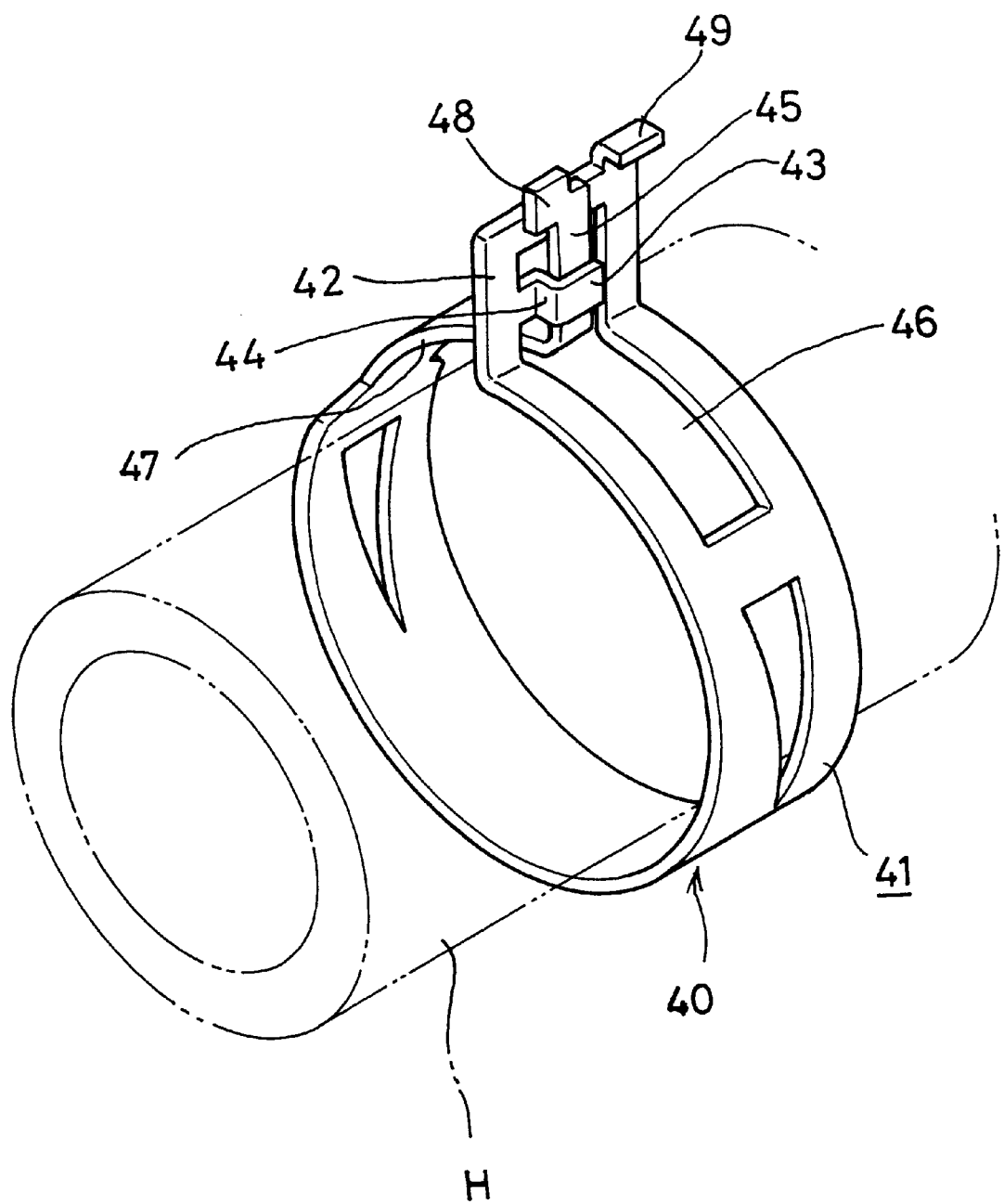
FIG. 5 is a perspective view of the hose clip of a second embodiment in accordance with the present invention.
Figure 6:
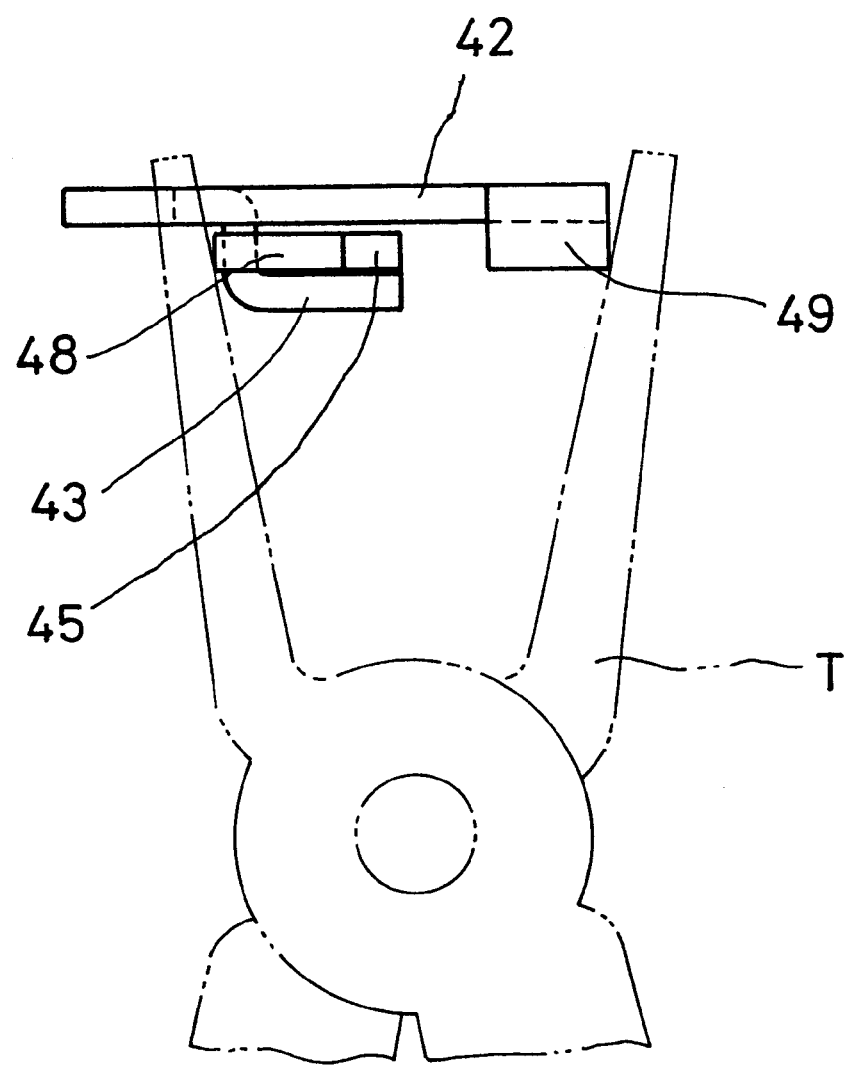
FIG. 6 is a partial plan view of the hose clip during the releasing operation.

FIGS. 5 and 6 illustrate a second embodiment of the invention. In the second embodiment, the clamping ring 41 of the hose clip 40 has one end formed with a radially rising or projecting first knob 42. The first knob 42 includes an engaging claw 43 inwardly horizontally protruding from one side edge thereof. The engaging claw 43 has a stepped portion 44 with a height approximately equal to the thickness of the second knob 45 which will be described later. As a result, the second knob 45 comes into close contact with the first knob 42 when engaged with the inside of the stepped portion 44 of the engaging claw 43.

The clamping ring 41 has a tapered narrow portion 47 at the other end thereof. The narrow portion 47 has approximately the same length as the groove 46 formed in the first knob 42 side. The other end of the clamping ring 41 is bent, passing through the first knob 42, so that the other end is spaced from both side edges of the groove 46 and has approximately the same curvature as the groove 46 portion of the clamping ring 41. The other end of the clamping ring 41 is bent to rise radially with respect to the clamping ring, thereby serving as the second knob 45. The second knob 45 has a height which is slightly larger than the first knob 42. The second knob 45 includes an axially shifted portion 48 at the distal end thereof. The shifted portion 48 is formed at the side opposite to the releasing operation portion 49. The shifted portion 48 is shifted so as not to interfere with the releasing operation portion 49 when the second knob 45 is disengaged from the engaging claw 43.

The releasing operation portion 49 is formed at an upper edge corner of the first knob 42. The releasing operation portion 49 is bent in a direction toward the engaging claw 43 side approximately at a right angle such that the releasing operation portion 49 and the shifted portion 48 are aligned axially with respect to the hose clip 40, as shown in FIG. 6. The releasing operation portion 49 and the shifted portion 48 are held by a tool T when the hose clip 40 is released from the spread-diameter state.

When the clamping ring 41 clamping the hose H as shown in FIG. 5 is released from the spread-diameter state, noses of the tool T such as long-nose pliers are applied to the shifted portion 48 of the second knob 45 and the releasing operation portion 49 of the first knob 42 as shown in FIG. 6. When the long-nose pliers are gripped, the first and second knobs 42 and 45 come close to each other, so that the second knob 45 is displaced sidewise (axially with respect to the hose clip 40) from the stepped portion 44 of the engaging claw 43 to be thereby disengaged from the engaging claw. Consequently, the clamping ring 41 deforms so as to reduce its diameter by the restoring spring force thereof, and the hose is clamped onto the pipe.

The shifted portion 48 and the releasing operation portion 49 are aligned axially with respect to the hose clip 40 when the tool T is gripped. Accordingly, operating forces of the tool T are applied to the shifted portion 48 and the releasing operation portion 49 respectively so as to be linearly opposite to each other. Thus, the second knob 45 is disengaged from the engaging claw 43 without the twisting of the clamping ring 41. Consequently, the hose clip 40 can be attached to the hose H in the normal state or so as to be perpendicular to the axis of the hose.

According to the second embodiment, the operating forces of the tool T are applied to the shifted portion 48 and the releasing operation portion 49 respectively so as to be linearly opposite to each other. As a result, the hose clip 40 can be released from the spread-diameter state even by a general purpose tool such as the long-nose pliers or another type of pliers without being twisted. Thus, since the releasing operation is readily executed without use of a dedicated tool, the limitations to the direction in which the tool is applied to the hose clip can be reduced. Accordingly, the above-described hose clip is effective in the use in a narrow space. Furthermore, since the releasing operation is executed at the distal ends of the respective knobs, the hose clip can be prevented from interfering with the tool during the restoring operation subsequent to the releasing.

Figure 7:
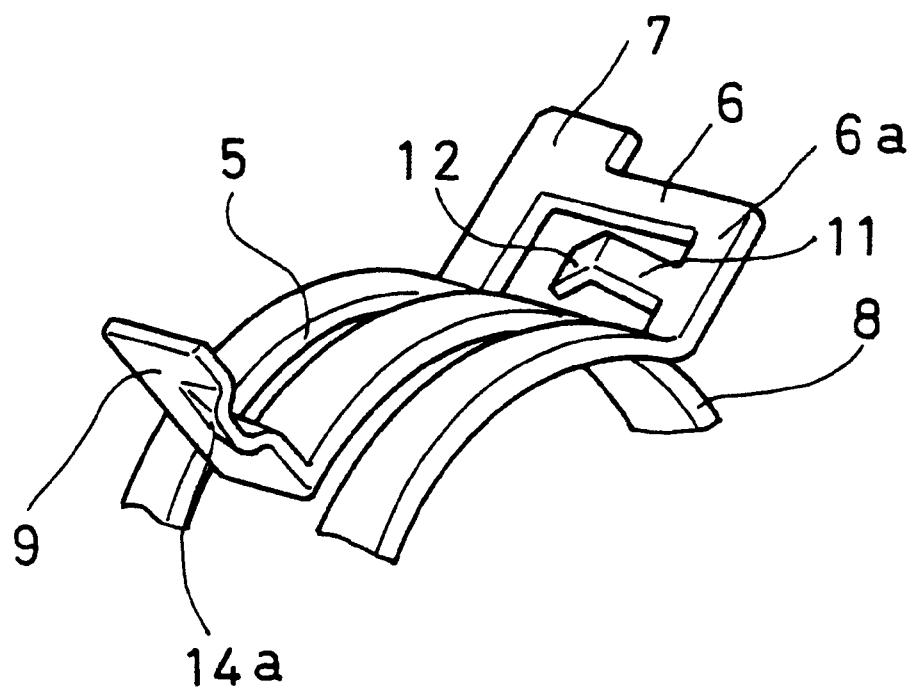
FIG. 7 is a partial perspective view of the hose clip of a third embodiment in accordance with the present invention.

FIG. 7 illustrates a third embodiment of the invention. In the third embodiment, the engaging portion 14a engaging the engaged piece 11 is formed by scraping out the side edge of the second knob 9. This formation of the engaging portion 14a increases the strength thereof.

Figure 8:
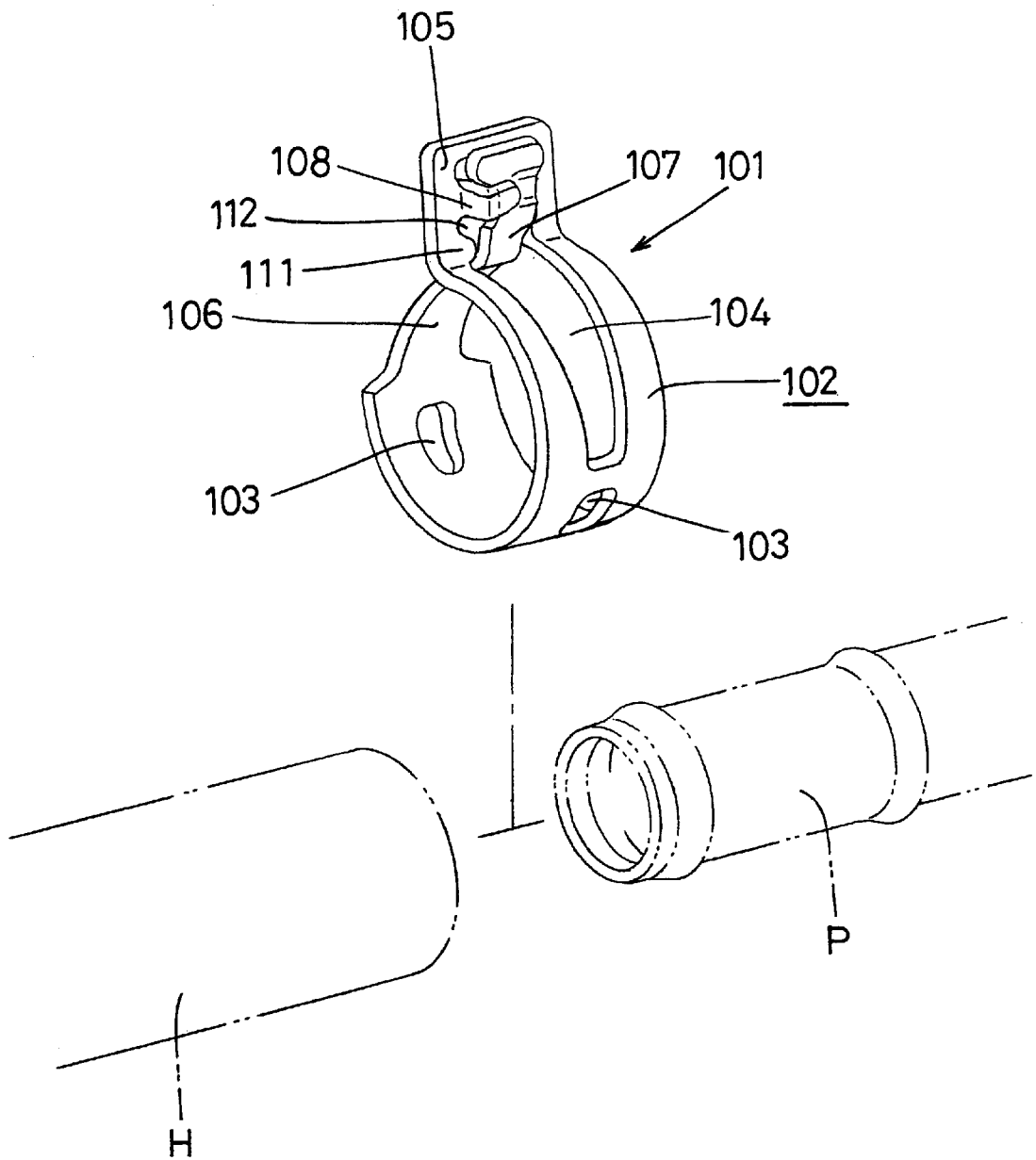
FIG. 8 is a perspective view of the hose clip of a fourth embodiment in the spread-diameter state.

FIGS. 8 to 14 illustrate a fourth embodiment of the invention. Referring to FIG. 8, the hose clip 101 is shown in the spread-diameter state. The hose clip 101 comprises a clamping ring 102 formed by circularly bending a strip of spring plate. The clamping ring 102 has two openings or triangular windows 103 in a circumferential face thereof so that a generally uniform clamping force is applied to an entire circumference of the hose H. The clamping ring 102 further has a groove 104 formed in a side of one of two ends thereof and having a predetermined length. The end including a part of the groove 104 is bent to rise radially with respect to the clamping ring 102, thereby serving as an arcuate first knob 105. The clamping ring 102 has a tapered narrow portion 106 at the other end thereof. The narrow portion 106 has approximately the same length as the groove 104. The other end of the clamping ring 102 is bent, and passes through the first knob 105, so that the other end is bent to rise radially with respect to the clamping ring, thereby serving as a second knob 107. The second knob 107 has approximately the same height as the first knob 105.

Figure 12:
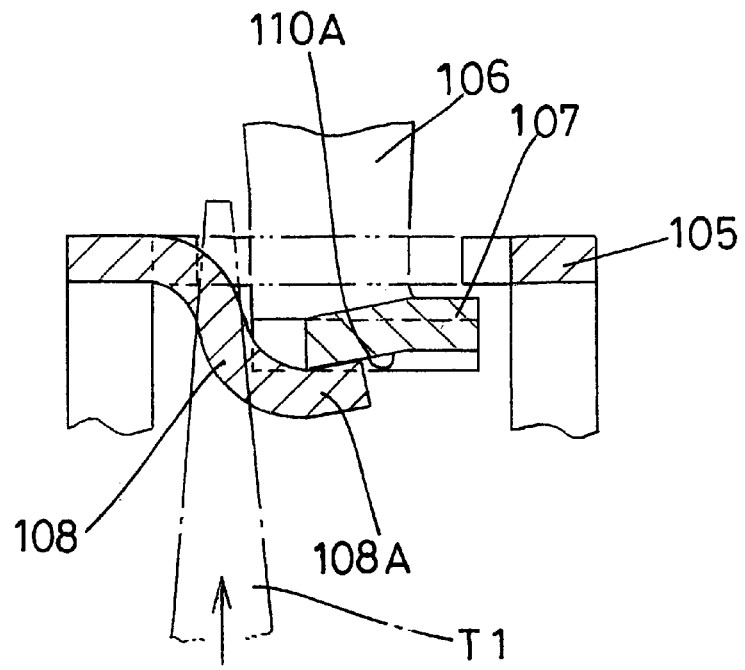
FIG. 12 is a partially enlarged sectional view of the hose clip, showing the bar tool inserted in the spread-diameter state.
Figure 13:
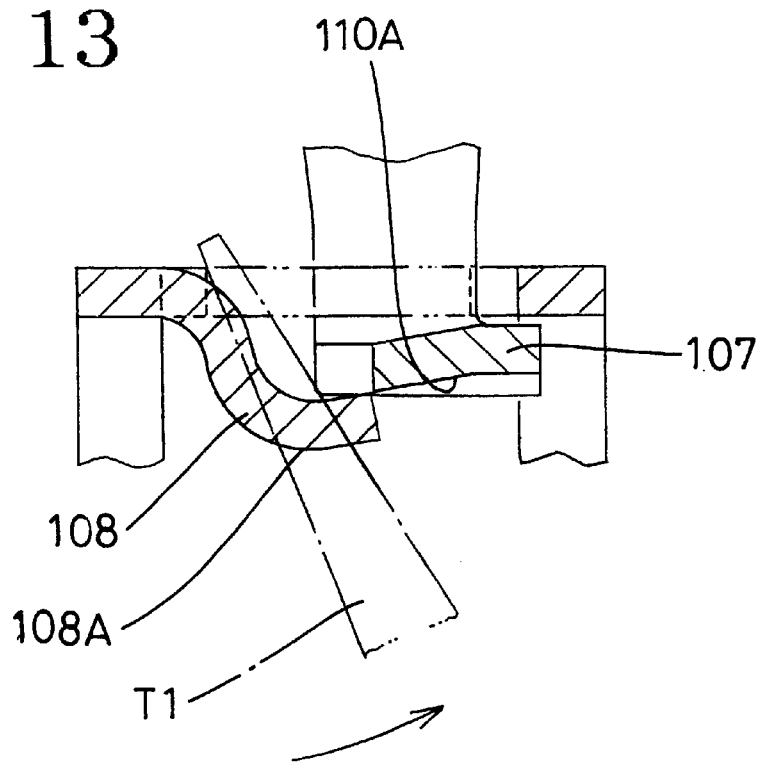
FIG. 13 is partially enlarged sectional view of the hose clip, showing the hose clip released from the spread-diameter state by prying with the bar tool.

An engaged piece 108 for holding the hose clip 101 in the spread-diameter state is formed on the central portion of one side piece constituting the first knob 105. The engaged piece 108 inwardly protrudes from the first knob 105 generally horizontally. More specifically, as shown in FIGS. 12 and 13, the engaged piece 108 is gently arcuately bent from its junction to the first knob 105. The distal end of the engaged piece 108 is further bent slightly toward the first knob 105 side, thereby serving as a hook portion 108A.

The second knob 107 has a notch 109 formed in one side edge thereof so as to correspond to the engaged piece 108. The second knob 107 further has a receiving face 110 formed adjacent the notch 109 so as to be disengageably engaged with the distal end of the engaged piece 108. The receiving face 110 is formed by scraping and has a width slightly larger than the engaged piece 108. The receiving face is horizontally recessed. More specifically, as shown in FIGS. 12 and 13, the second knob 107 includes a biting face 110A extending widthwise from the side edge at the notch 109 side approximately to the central portion. The biting face 110A has a gradually increasing depth so as to be closely fitted to the inner face side of the hook portion 108A, whereupon the biting face 110A is prevented from being easily disengaged. The other portion of the second knob 107 has a generally uniform depth.

The first knob 105 includes a generally semicircular stopper protrusion 111 inwardly protruding below the engaged piece 108. A space defined by the stopper protrusion 111, engaged piece 108 and the second knob 107 serves as an insert space 112. The distal end of a bar tool T1 is inserted into the insert space 112 and the bar tool is then pried so that the first and second knobs 105 and 107 are displaced in opposite directions to disengage the engaged piece 108 from the receiving face 110 so that the clamping ring 102 is released from the spread-diameter state.

Figure 10:
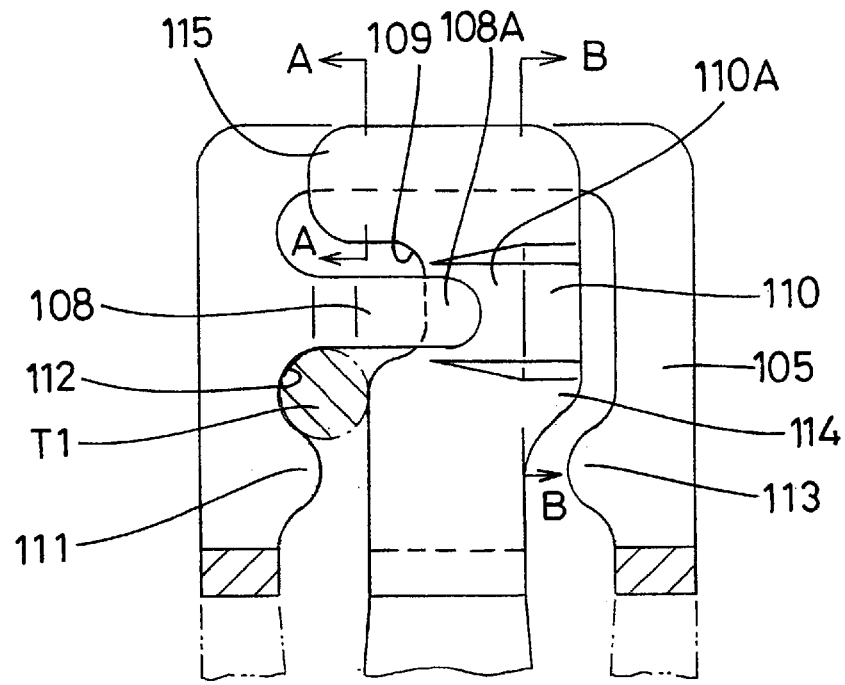
FIG. 10 is a partially enlarged front view of the hose clip in the spread-diameter state with the bar tool being inserted.
Figure 11:
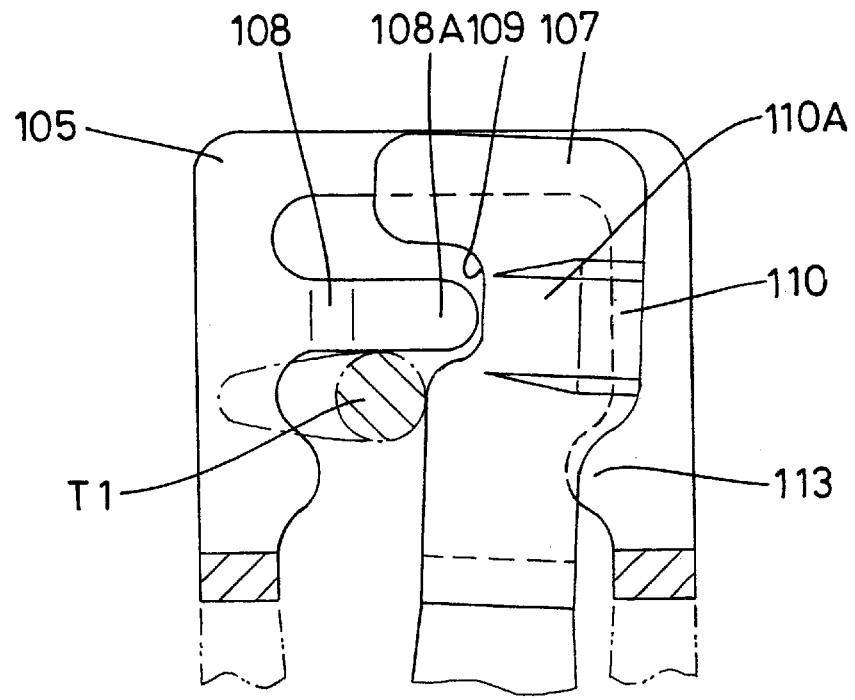
FIG. 11 is a partially enlarged front view of the hose clip released from the spread-diameter state by prying with the bar tool.

In order that the tool may be prevented from being inserted into a space other than the insert space 112, the space between the first and second knobs 105 and 107 (space between the side edges of the knobs) is narrowed in the fourth embodiment (see FIG. 10). More specifically, the first knob 105 has a protrusion 113 similar to the stopper protrusion 111 and opposite thereto. The second knob 107 has a uniform width in its portion rising from the clamping ring 102. The second knob 107 further includes a first expanded portion 114 formed in a region of one side edge thereof above its portion facing the protrusion 113 or the region outside the line B—B in FIG. 10. The second knob 107 further has a second expanded portion 115 formed in a region of the other side thereof above the notch 109 or the region outside the line A—A in FIG. 10. Consequently, the space between the first and second knobs 105 and 107 is smaller than the outer diameter of the distal end of the bar tool T1 except at the insert space 112.

The bar tool T1 includes a grip portion (not shown in FIG. 9), a releasing portion 116 extending axially with respect to the grip portion and having a tapered distal end. The releasing portion 116 is formed so that the distal end thereof is inserted into the insert space 112 by a predetermined length.

The operation of the hose clip 101 will now be described. The clamping ring 102 is first held in the spread-diameter state before the hose clip 101 is attached to the hose H. In this case, the upper ends of both knobs 105 and 107 of the hose clip 101 in the free state or reduced-diameter state are held by the straight jaws of the pliers or the like respectively so that the knobs are caused to come close to each other. The hook portion 108A of the engaged piece 108 is then slid on the backside of the receiving face 110. When the pliers are further gripped, the second knob 107 is guided by the hook portion 108A with a predetermined inclination axially with respect to the clamping ring 102 to thereby depart away from the engaged piece 108. As a result, the hook portion 108A of the engaged piece 108 moves round to the surface side of the second knob 107, so that the second knob 107 is returned to the former state and the engaged piece 108 engages the receiving face 110 of the second knob 107. Consequently, the hose clip 101 is held in the spread-diameter state.

The hose clip 101 is carried to the work site for connection of the hose H with the clamping ring 102 being held in the spread-diameter state. At the work site, the clamping ring 102 in the spread-diameter state is fitted on a nozzle of the hose H, and then, the hose H is fitted on the pipe. The hose clip is moved to a predetermined clamping position.

The releasing portion 116 of the tool T1 is then inserted into the insert space 112 so that the hose clip 1 is released from the spread-diameter state.

The space between the knobs 105 and 107 except for the insert space 112 is set so that the tool T1 cannot be inserted thereinto. Accordingly, the tool T1 can be prevented from being inserted into an erroneous space.

Figure 9:
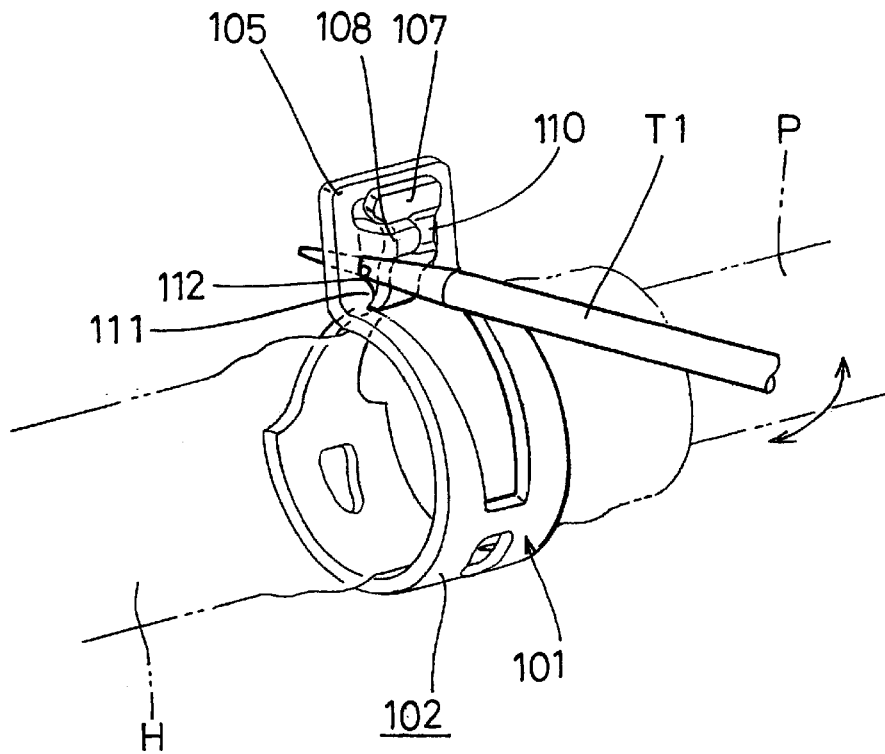
FIG. 9 is a perspective view of the hose clip being released from the spread-diameter state.
Figure 14:
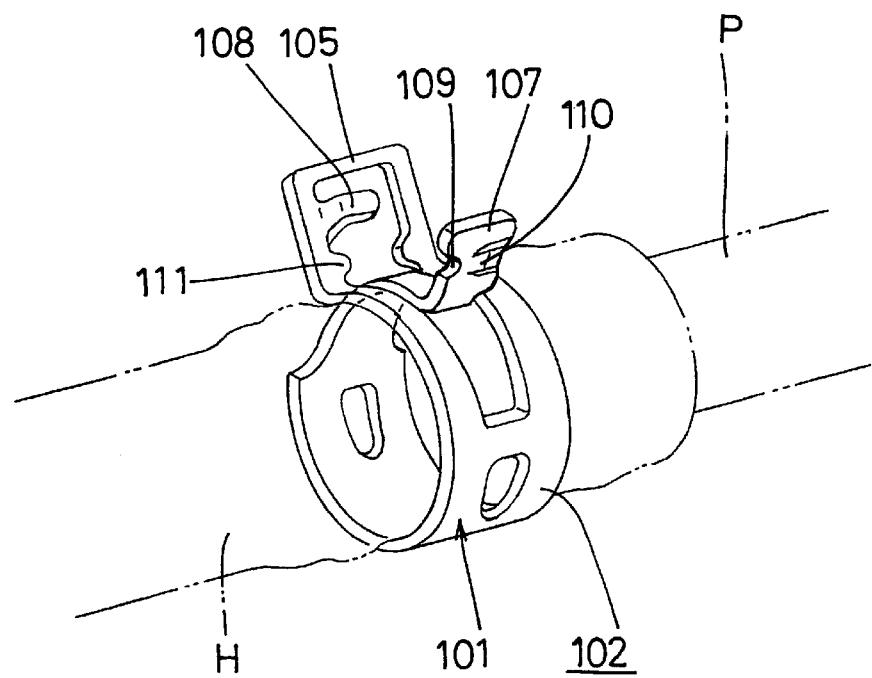
FIG. 14 is a perspective view of the hose clip in the reduced-diameter state.

Thus, the tool T1 is reliably inserted into the insert space 112 as shown in FIGS. 9, 10 and 12. Subsequently, when the bar tool T1 is pried in the direction of the arrow in FIG. 13, the second knob 107 is displaced axially with respect to the clamping ring 102 so as to depart away from the engaged piece 108. The clamping ring 102 is rapidly returned to the reduced-diameter state by its spring force when the hook portion 108A of the engaged piece 108 is completely disengaged from the receiving face 110. Consequently, the hose H is clamped to the pipe P to be connected thereto.

Differing from the prior art, the above-described fourth embodiment provides the hose clip 101 which can be released from the spread-diameter state by the bar tool T1 in a small working space. Accordingly, the hose clip 101 is suitable for the disposition in which other parts or the like are closely positioned around it. With the use of the bar tool T1, the limitations to the direction in which the bar tool is applied to the hose clip can be reduced, and thus the degree of freedom in the working can be improved.

Figure 15:
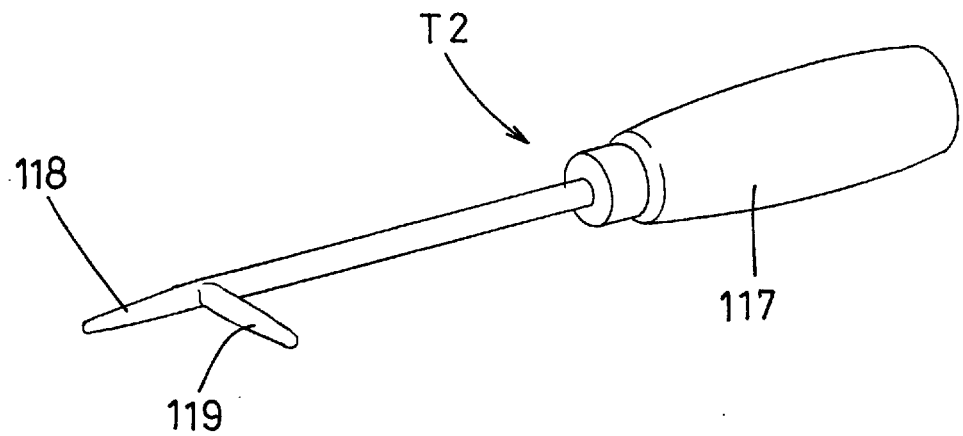
FIG. 15 is a perspective view of another releasing bar tool.
Figure 16:
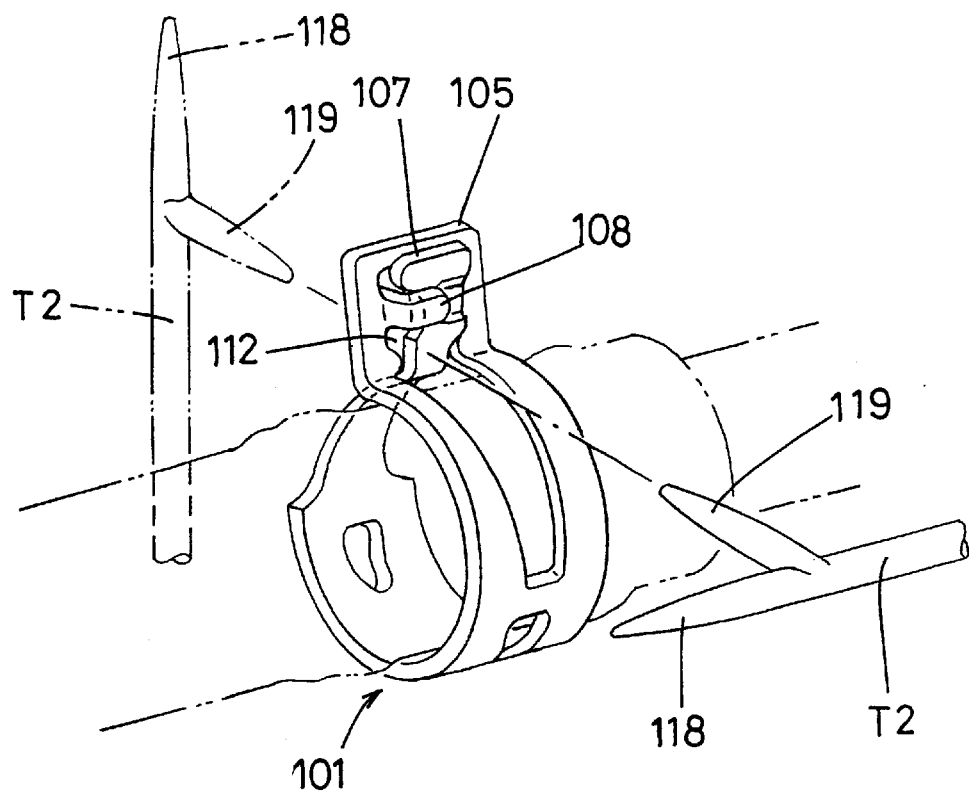
FIG. 16 shows an example of the releasing work performed from a plurality of directions by the use of the bar tool of FIG. 15.
Figure 17:
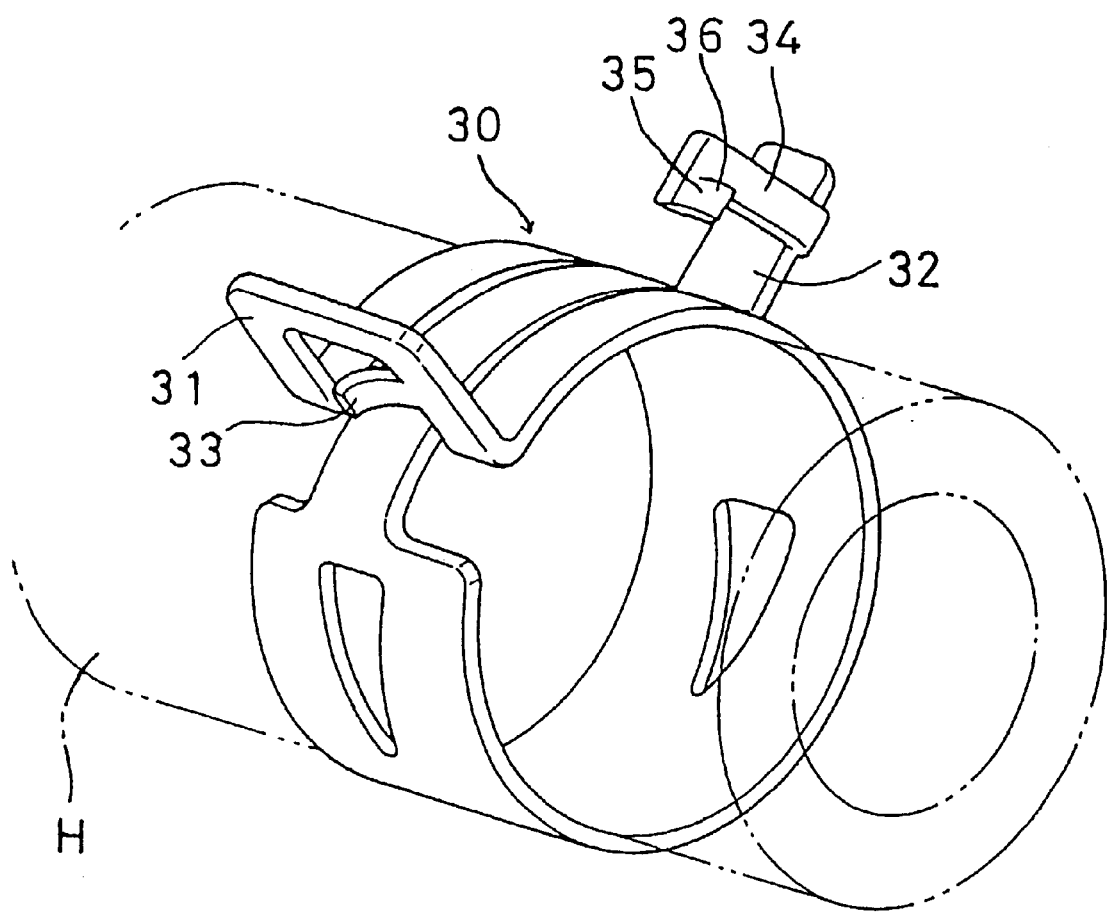
FIG. 17 is a perspective view of a prior art hose clip in the reduced-diameter state.
Figure 18A:
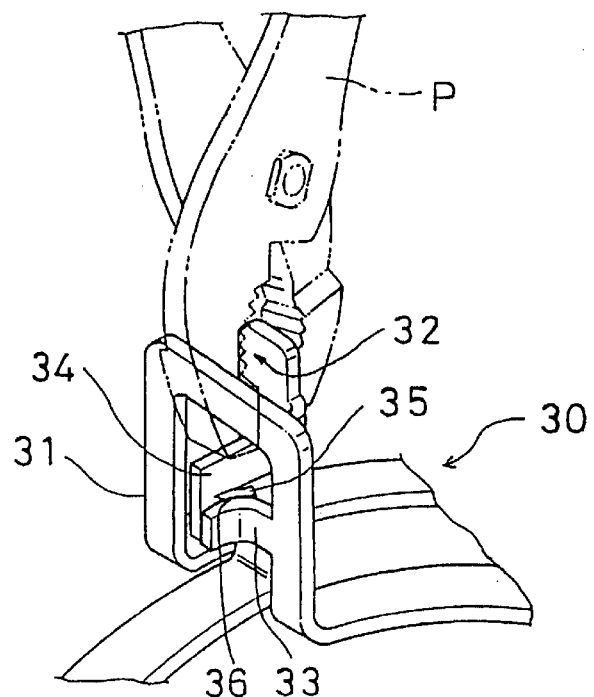
FIGS. 18A–18B are a perspective views of the prior art hose clip being released from the spread-diameter state.
Figure 18B:
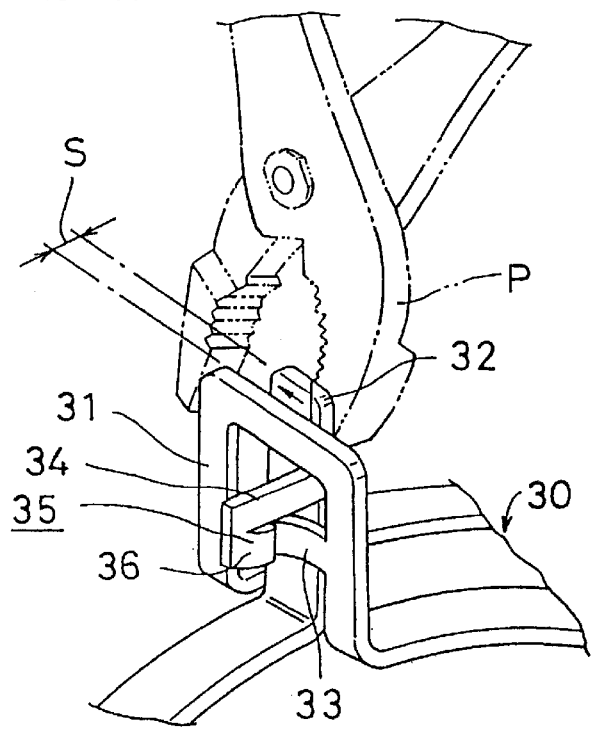

FIGS. 15 and 16 illustrate a modified form of the releasing bar tool. The shown bar tool T2 comprises a grip portion 117, a master releasing portion 118 extending axially with respect to the grip portion 117, and a branched releasing portion 119 branched from the master releasing portion 118 at a location near the distal end thereof in the direction approximately perpendicular thereto. Each of the releasing portions 118 and 119 is insertable into the insert space 112.

The hose clip 101 is released from the spread-diameter state by the branched releasing portion 119 as well as by the master releasing portion 118. Furthermore, since the releasing portions protrude in the different directions, the branched releasing portion 119 can be inserted into the insert space 112 even when the insert space is not located on the axis of the master releasing portion 118 along which it is inserted. Accordingly, when the master releasing portion 118 of the bar tool is used, the bar tool T2 can be inserted substantially from the entire circumference of the hose clip within a plane along the plane perpendicular to the plane defined by the insert space 112. Furthermore, when the branched releasing portion 119 is used, the bar tool T2 can be inserted substantially from the entire circumference of the hose clip within a plane along the plane defined by the insert space 112. As a result, an operation range of the hose clip can exceedingly be increased. Additionally, the tool can be inserted into the insert space 112 at both sides thereof.

The branched releasing portion 119 is caught by the stopper protrusion 111 when the master releasing portion 119 is located over the hose clip 101 and moved downward so that the branched releasing portion 119 is inserted into the insert space 112 or while the releasing operation is being executed. Consequently, the hose H can be prevented from being damaged by the master releasing portion 118.

In the above-described first embodiment, the engaged piece may be provided at the second knob side and the engaged piece may be provided at the first knob side. Furthermore, the side edge of either knob may be engaged with the engaged piece without provision of the engaged piece.

Although the releasing operation portion 49 is provided at the first knob 42 side in the second embodiment, it may be provided at the second knob 45 side, or two releasing operation portions may be provided on both knobs so as to be opposite to each other respectively.

In the foregoing fourth embodiment, a tapered guide face may be formed on the circumferential opening edge of the insert space 112 to guide the tool. As a result, the tool can be operated remotely or in a work space where the tool is viewed with difficulty. Furthermore, the number and the projecting direction of the branched releasing portion 119 of the bar tool T2 should not be limited to those described above respectively. Although the engaged piece is formed on the first knob side in the fourth embodiment, it may be formed on the second knob side, or two engaged pieces may be formed on the first and second knobs respectively.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A hose clip comprising:

a clamping ring formed of a strip of spring plate having a first free end and a second free end, said clamping ring being deformable between a reduced-diameter state in which a diameter thereof is reduced with each of the first and second free ends being maintained in a natural position, and a spread-diameter state in which the first and second free ends are moved close to each other from the natural position so that the diameter of the clamping ring is increased relative to the diameter of the clamping ring in the reduced-diameter state;

an opening through one of said free ends of said spring plate strip defining an arcuate portion at said one free end;

a first knob defined by said arcuate portion being bent radially outward with respect to said clamping ring;

a second knob defined by the other of said free ends of said spring plate strip being bent radially outward with respect to said clamping ring, said second knob being slidable toward and away from said first knob;

an engaged piece formed on said one free end of said spring plate strip and within the width of said spring plate strip, said engaged piece extending axially with respect to said clamping ring and being bent angularly toward said second knob in the reduced-diameter state, wherein an end portion of said engaged piece is folded back;

an engaging edge formed on the other free end of said spring plate for engaging said engaged piece when said first and second knobs are slid in a direction towards each other, thereby holding said clamping ring in the spread-diameter state with the first and second knobs being substantially superposed; and a guide face provided on a portion of said engaged piece, wherein, when said first and second knobs are moved close to each other, said engaging edge engages said guide face of said engaged piece and said engaged piece and said engaging edge are axially displaced relative to said clamping ring and then said engaged piece abuts said engaging edge.

2. A hose clip as claimed in claim 1, wherein said engaged piece guide face is inclined in a first direction, and said engaging edge has an inclined guide face which extends in a direction that is opposite to the first direction, and the inclination of said engaged piece guide face is the same as the inclination of said inclined guide face of said engaging edge.

3. A hose clip as claimed in claim 1, wherein at least one of said first and second knobs has a releasing operation portion which is bent toward said engaged piece so that said releasing operation portion and an end of the other of said first and second knobs are aligned axially with respect to said clamping ring.

4. A hose clip as claimed in claim 2, wherein at least one of said first and second knobs has a releasing operation portion extending toward the other of said first and second knobs.

5. A combination of a hose clip and a bar tool for operating said hose clip:

a) said hose clip comprising:

a strip of spring plate bent into the form of a clamping ring, said spring plate strip having a first free end and a second free end, wherein said clamping ring is deformable between a reduced-diameter state in which each of the first and second free ends is maintained in a natural position, and a spread-diameter state in which the first and second free ends are moved towards each other from the natural position so that the diameter of the clamping ring is increased;

an opening extending through one of said free ends of said spring plate strip, said opening forming an arcuate portion at said one free end of said spring plate strip;

a first knob defined by said arcuate portion which is bent radially outward with respect to said clamping ring;

a second knob defined by the other of said free ends of said spring plate strip which is bent radially outward with respect to said clamping ring, said second knob being slidable toward and away from said first knob;

an engaged piece formed on said one free end of said spring plate strip so as to project axially with respect to said clamping ring within a width of said strip of spring plate;

an engaging edge formed on the other free end of said strip of spring plate so as to pass over said engaged piece so as to be engaged therewith when said first and second knobs are slid close to each other, thereby holding said clamping ring in the spread-diameter state with said first and second knobs being substantially superposed; and an insert space defined between a side edge of said first knob and a side edge of said second knob, b) said bar tool comprising a grip portion, a master releasing portion extending axially with respect to the grip portion in the form of a bar, and a branched releasing portion branched from the master releasing portion and extending in the form of a bar, wherein said bar tool is provided for releasing said first and second knobs from engagement with each other when said clamping ring is in the spread-diameter state, and said bar tool can be inserted into said insert space in order to axially move said first and second knobs with respect to said clamping ring so that said engaged piece and said engaging edge are released from engagement.

6. The combination as claimed in claim 5, wherein a plurality of spaces, in addition to said insert space, are defined between edges of said first and second knobs when said clamping ring is in the spread-diameter state, and said edges of said first and second knobs are positioned so that each of said plurality of spaces, except for said insert space, has a maximum width which is less than an outer diameter of a distal end of said bar tool.

7. The combination as claimed in claim 6, wherein said insert space is nearer to said clamping ring than to said engaged piece.

8. The combination as claimed in claim 5, wherein said insert space is nearer to said clamping ring than to said engaged piece.

9. A hose clip comprising:

a strip of spring plate bent into the form of a clamping ring, said spring plate strip having a first free end and a second free end, wherein said clamping ring is deformable between a reduced-diameter state in which each of the first and second free ends is maintained in a natural position, and a spread-diameter state in which the first and second free ends are moved towards each other from the natural position so that the diameter of the clamping ring is increased;

an opening extending through one of said free ends of said spring plate strip, said opening forming an arcuate portion at said one free end of said spring plate strip;

a first knob defined by said arcuate portion which is bent radially outward with respect to said clamping ring;

a second knob defined by the other of said free ends of said spring plate strip which is bent radially outward with respect to said clamping ring, said second knob being movable toward and away from said first knob;

an engaged piece formed on said one free end of said spring plate strip so as to project axially with respect to said clamping ring within a width of said strip of spring plate;

an engaging edge formed on the other free end of said strip of spring plate so as to pass over said engaged piece so as to be engaged therewith when said first and second knobs are moved close to each other, thereby holding said clamping ring in the spread-diameter state with said first and second knobs being substantially superposed; and a plurality of spaces defined between opposing side edges of said first and second knobs, wherein one of said plurality of spaces is an insert space for receiving a bar tool therein in order to axially move said first and second knobs with respect to said clamping ring and thereby release said engaged piece and said engaging edge from engagement, wherein said insert space is located nearer to said clamping ring than to said engaged piece, and a portion of one of said side edges of said first and second knobs, which in part define said insert space, forms a stopper protrusion near said clamping ring, said stopper protrusion projecting in a direction towards the opposing edge of the other of said first and second knobs so that a distance between the opposing edges of said first and second knobs, at said stopper protrusion, is less than a maximum width of said insert space.

* * * * *